No. 624,950. Patented May 16, 1899.
F. LATIMER.
VEHICLE WHEEL.
(Application filed Dec. 23, 1897.)
(No Model.)
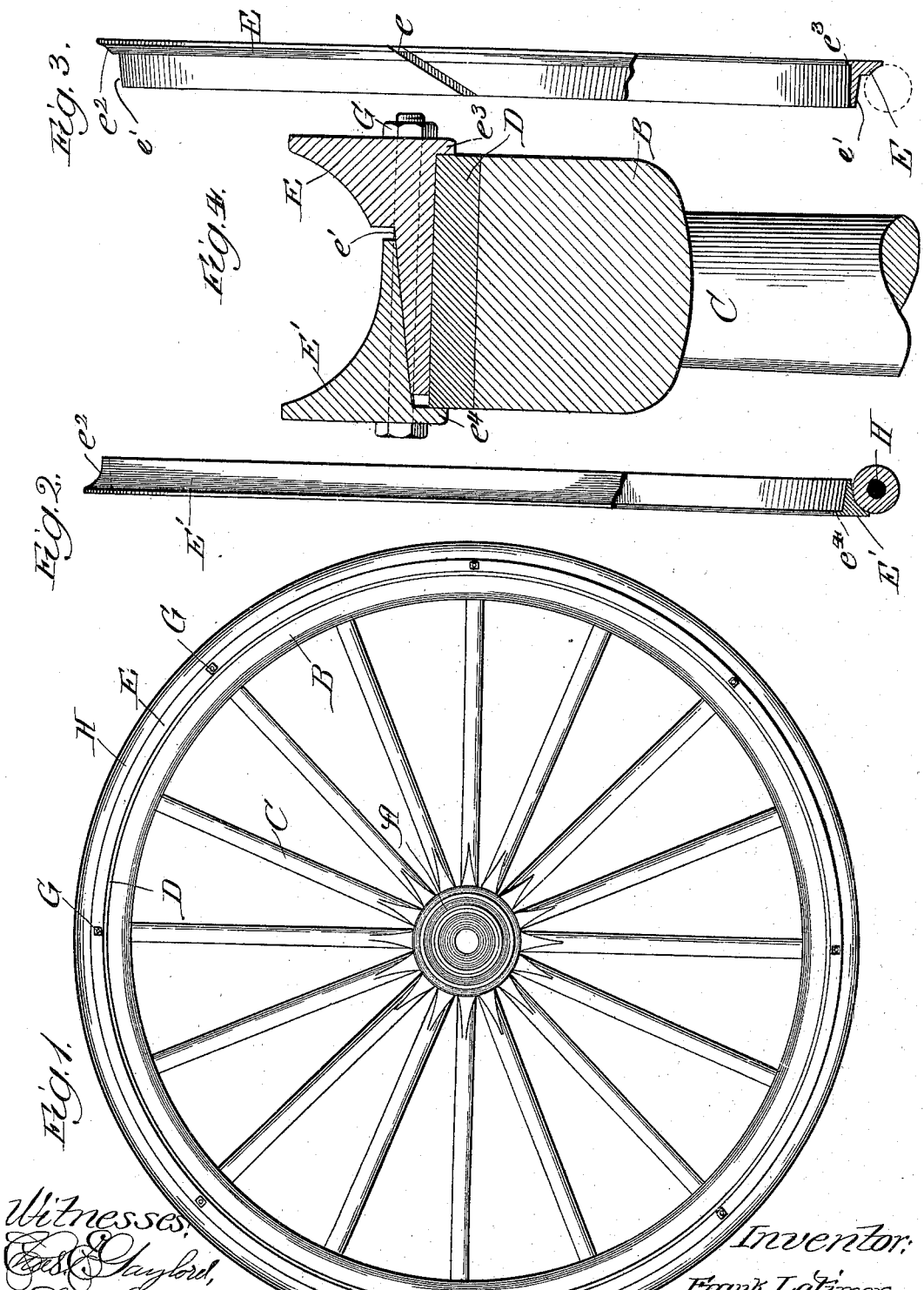

UNITED STATES PATENT OFFICE.

FRANK LATIMER, OF HUNTLEY, ILLINOIS.

VEHICLE-WHEEL.

SPECIFICATION forming part of Letters Patent No. 624,950, dated May 16, 1899.

Application filed December 23, 1897. Serial No. 663,226. (No model.)

*To all whom it may concern:*

Be it known that I, FRANK LATIMER, a citizen of the United States, residing at Huntley, Illinois, have invented certain new and useful Improvements in Vehicle-Wheels, of which the following is a specification.

My invention relates particularly to wheels adapted for road-vehicles—such as carriages, delivery-wagons, &c.—and especially to the means by which pneumatic or cushioned tires may be secured to wheels such as are now in use without in any way disturbing or changing such structures.

The object of my invention is to provide simple, economical, and efficient means for securing a cushion or similar tire to a vehicle-wheel; and the invention consists in the features, combinations, and details of construction hereinafter described and claimed.

In the accompanying drawings, Figure 1 is a side elevation of the wheel. Figs. 2 and 3 are broken edge views of parts of the rim. Fig. 4 is a cross section of the same.

In fitting a wheel with my improvements I use an ordinary hub A, fellies B, spokes C, and preferably a metallic tire D. Thus far the wheel described and shown in the drawings is of the ordinary construction. To fit it with my improvements, I make a rim or ring of two parts E and E', the main part E being preferably split at $e$ and adapted to fit the metal tire of the wheel. The outer surface of the part E is conical or tapered, as at $e'$, and the inner surface of the part E' is bored or tapered to fit the cone-shaped taper of the main portion. Both of the parts when taken together are concaved, as at $e^2$, so that when they are in the position shown in Fig. 4 a cushion or other tire may be secured therein. Both of the parts are also preferably provided with shoulders or flanged rims $e^3$ and $e^4$, adapted to bear against the face of the wheel-tire. In order to secure this two-part ring or rim to the wheel, the parts are perforated transversely and bolts G used to tighten them together and hold them in position thereon, as well as to hold the tire H in position.

In assembling the parts the main portion is placed on the wheel. The cushion or other tire is then placed in position and the second portion of the rim placed in engagement with the main portion. The bolts are then inserted and tightened, thus securing the parts together and to the wheel. The split ring allows for a slight variation in the diameter of the wheels, so that my improvements may be used in connection with different-sized wheels and be kept in stock for sale or use whenever desired.

In the case of new wheels the metallic tire D may be dispensed with and the main portion of the rim E used in place thereof. In such instances it will not be necessary to split the ring at $e$.

While I have described my invention with more or less minuteness as regards details and as being embodied in certain precise forms, I do not desire to be limited thereto unduly any more than is pointed out in the claims. On the contrary, I contemplate all proper changes in form and construction, the omission of immaterial parts, and the substitution of equivalents as circumstances may suggest or necessity render expedient.

I claim—

1. In a vehicle-wheel, the combination of a rim portion made in two parts telescopically fitting each other and forming a peripheral groove for the reception of a cushion-tire, one part—the inner—having an inwardly-extending flange on its lateral edge contacting the wheel-felly and provided with an outer tapered surface split transversely, the other or outer part having an inwardly-extending flange on its lateral edge arranged to contact the other side of the felly and provided with an inner tapered surface arranged to fit the outer tapered surface of the other part, means for securing the parts together and to the felly of the wheel, and a cushion-tire in the peripheral groove, substantially as described.

2. In a vehicle-wheel, the combination of a metallic rim made in two parts telescopically fitting each other and forming a peripheral groove for the reception of a cushion-tire, one part—the inner—having an inwardly-extending flange at its lateral edge contacting one face of the felly and provided with a conical surface on a portion of its periphery, the outer portion of the rim having an inwardly-extending flange at its lateral edge contacting the other face of the wheel-felly and provided with an inner tapered surface fitting the outer tapered surface of the other part, bolt-and-nut mechanism passed transversely through both parts to secure them together and to the wheel-felly, and a cushion-tire in the peripheral groove of the rim, substantially as described.

3. In a vehicle-wheel, the combination of a rim portion made in two parts telescopically fitting each other, the inner part being split transversely and conically tapered to form the outer portion and both parts concaved so as to form a concaved peripheral recess to receive a cushioned tire, an inner extending flange on each part adapted to strike the faces of the wheel, a cushioned tire in the rim, and bolts for securing the two parts of the rim together and to the wheel, substantially as described.

FRANK LATIMER.

Witnesses:
THOMAS F. SHERIDAN,
THOMAS B. MCGREGOR.